United States Patent

[11] 3,618,051

[72] Inventor Robert E. Oleksiak
Carlisle, Mass.
[21] Appl. No. 823,253
[22] Filed May 9, 1969
[45] Patented Nov. 2, 1971
[73] Assignee Sperry Rand Corporation
Great Neck, N.Y.

[54] NONVOLATILE READ-WRITE MEMORY WITH ADDRESSING

7 Claims, 4 Drawing Figs.

[52] U.S. Cl. .......... 340/173 R, 307/238, 307/279

[51] Int. Cl. .......... G11c11/40, H03k 3/29

[50] Field of Search .......... 340/173; 307/238, 279

[56] References Cited

UNITED STATES PATENTS

| | | | |
|---|---|---|---|
| 2,969,481 | 1/1961 | Sack, Jr. .......... | 315/169 |
| 3,490,007 | 1/1970 | Igarashi .......... | 340/173 |
| 3,493,786 | 2/1970 | Ahrons et al. .......... | 307/279 |

*Primary Examiner*—James W. Moffitt
*Attorney*—S. C. Yeaton

ABSTRACT: Variable-threshold insulated gate field effect transistors are used as memory elements in an integrated circuit memory array. A word-select address decoder is junction isolated from the rest of the memory. Substrates of all memory transistors are kept at the same voltage level and gating means are used to switch suitable voltages to remaining drain and source electrodes of individual memory cells for READ-WRITE functions. Logic level output is available at separately gated bit lines.

SET POSTIVE THRESHOLD

SET NEGATIVE THRESHOLD

INHIBIT SET

INVENTOR
ROBERT E. OLEKSIAK
BY
Joseph W. Roehl
ATTORNEY

INVENTOR
ROBERT E. OLEKSIAK
BY Joseph M Roehl
ATTORNEY

NONVOLATILE READ-WRITE MEMORY WITH ADDRESSING

The invention herein described was made in the course of or under the contract or subcontract thereunder with the Department of the Air Force.

BACKGROUND OF THE INVENTION

1. Field of the Invention

This invention relates to a digital memory and more particularly to an integrated electrically alterable nonvolatile storage system.

2. Description of the Prior Art

Digital memory circuits constructed in the form of integrated circuits are known in the prior art. Each bit line in these prior art devices must be separated from the other bit lines by isolation diffusion. This requires considerable space and limits the component density. Furthermore, many of these prior art devices require writing pulses having closely controlled wave shapes.

Moreover, in such prior art devices, these two factors make fabrication difficult so that the percentage yield of acceptable units is sharply curtailed.

SUMMARY OF THE INVENTION

Variable-threshold insulated gate field effect transistors are used as memory elements in an integrated circuit memory array in which READ, WRITE and storage functions are performed with the substrate of all memory transistors maintained at the same voltage level so as to permit isolation of the various channels without the need for additional isolation means.

DESCRIPTION OF THE PREFERRED EMBODIMENT

Copending patent application Ser. No. 767,230 "Plural Dielectric Layered Electrically Alterable Nondestructive Readout Memory Element" filed Oct. 14, 1968 in the name of Horst A. R. Wegener and assigned to the present assignee concerns a variable threshold memory cell in the form of an insulated gate field effect transistor. In this device, the gate electrode is separated from the substrate by a dielectric having at least two layers. These layers have different conductivities. Each layer also has a nonlinear resistance characteristic. The abrupt change of conductivity within the combined dielectric permits charge storage that can be utilized to perform memory functions. This charge storage is believed to be concentrated at the interface between the dielectric layers.

Figure 1:
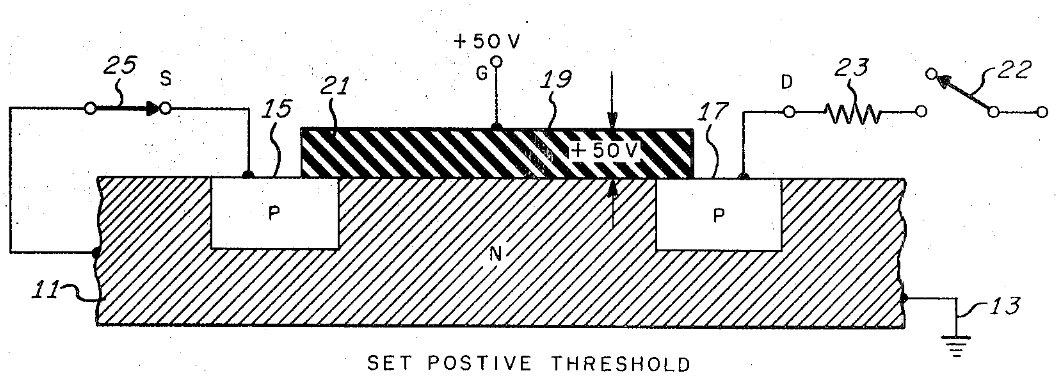
FIGS. 1–3 are diagrams useful in explaining the operation of the invention.
Figure 2:
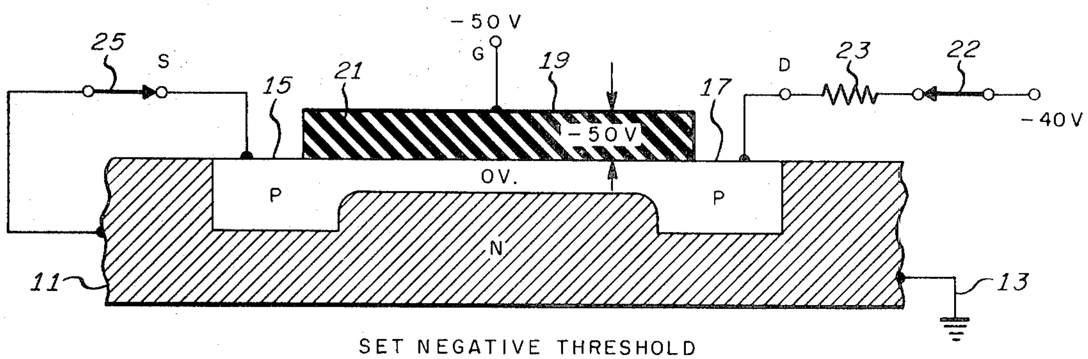
Figure 3:
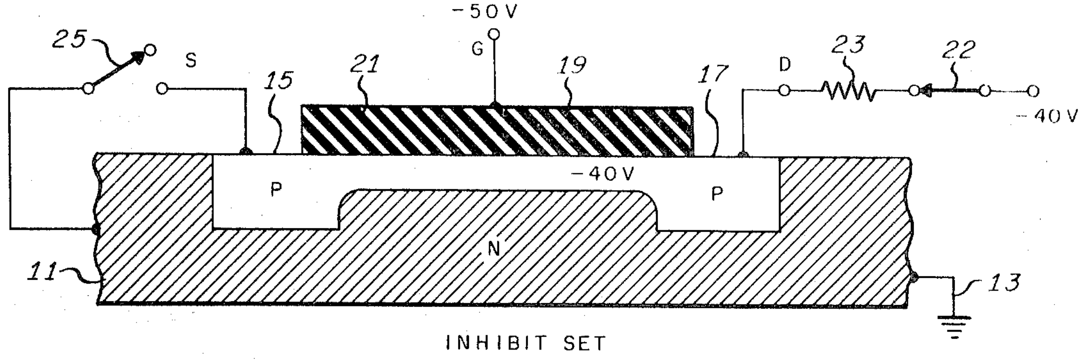

FIGS. 1–3 illustrate the operation of such a variable-threshold transistor when connected in a circuit employing the principles of the present invention.

The present invention employs a separate variable-threshold transistor memory cell at each bit position in the memory.

The memory is first preset by switching each memory cell to a positive-threshold value as illustrated in FIG. 1. In this condition, each memory cell effectively stores a binary ZERO.

Binary information is then written into the memory cells as illustrated in FIGS. 2 and 3. A binary ONE is written into selected memory cells by applying a WRITE gate voltage so as to set these cells to a negative-threshold value as indicated in FIG. 2. At the same time, the cells that are to store a binary ZERO are subjected to the INHIBIT ZERO condition illustrated in FIG. 3 while the WRITE voltage is applied.

P-channel enhancement transistors are presently preferred as memory cells as illustrated in FIGS. 1–3. It will be understood, however, that N-channel transistors may be used if desired by substituting voltages of the reverse polarity where necessary.

Referring particularly now to FIG. 1, a variable-threshold transistor is formed on an N-doped substrate 11. For purposes of illustration, this substrate may be considered as being connected to a suitable reference point such as a ground connection 13. A first PN-junction 15 forms a source and a second PN-junction 17 forms a drain. A gate electrode 19 is separated from the substrate by a plural dielectric 21 in accordance with the principles of the aforementioned patent application.

The drain 17 may be connected through a drain switch 22 and a drain resistor 23 to a suitable voltage source. The drain resistor has a resistance many times that of the memory cell when that cell conducts.

The source 15 may be optionally connected to the substrate through a source switch 25.

FIG. 1 illustrates the voltage conditions when this transistor is set to the positive-threshold value. The source switch 25 is closed so as to set the source electrode to ground level. The drain switch is open so that no voltage is applied to the drain. A voltage pulse of +50 volts is applied to the gate electrode. This causes a 50-volt potential to be applied across the plural dielectric. This voltage is stored in the dielectric and serves as a positive threshold. Voltages subsequently applied between the gate and substrate that are less than this value will not affect the charge on the plural dielectric to an significant degree.

When the transistor has been set to the positive threshold in this manner, it may be considered to be in the binary ZERO state.

Under these conditions, current flow from the source to the drain electrodes would be established in response to an externally applied READ voltage by virtue of the charge stored in the dielectric 21.

A memory cell is set to the binary ONE state as shown in FIG. 2. The transistor is set to the negative threshold by means of a negative WRITE pulse applied to the gate electrode 19. To perform this function, the drain switch 22 and the source switch 25 remain closed. A voltage intermediate ground and the voltage applied to the gate is applied to the drain 17. This is typically in the order of −40 volts.

With a negative 50-volt potential applied to the gate electrode, a conducting channel is formed between the source and drain electrodes in a manner well known in the field effect transistor art. This channel, however, remains at ground potential since the channel is clamped to ground through the switch 25. Thus, a potential of −50 volts is applied across the plural dielectric 21. The original stored potential is quickly discharged through the source switch 25 and replaced by a −50-volt charge. The memory cell is set at the negative threshold so as to permit storage of a binary ONE.

If a READ voltage is subsequently applied between the source and drain while the memory cell is storing a binary ONE, current flow between these elements will be inhibited.

For those memory cells that are to remain in the binary ZERO state, the transistor is set to the INHIBIT SET condition of FIG. 3 by the same −50-volt WRITE pulse. In this situation, the drain remains connected to the −40-volt source but the source switch is opened during the time that the −50-volt WRITE pulse is applied.

A conducting channel is formed under these conditions. However, the channel remains substantially at the −40-volt potential.

When the −50-volt WRITE pulse is applied under these conditions, there is only a 10-volt difference of potential across the plural dielectric 21. The channel shields the dielectric from the substrate voltage. This relatively low potential causes substantially no disturbance of the originally stored charge. After completion of the WRITE function, the memory cell returns to the binary ZERO state.

Figure 4:
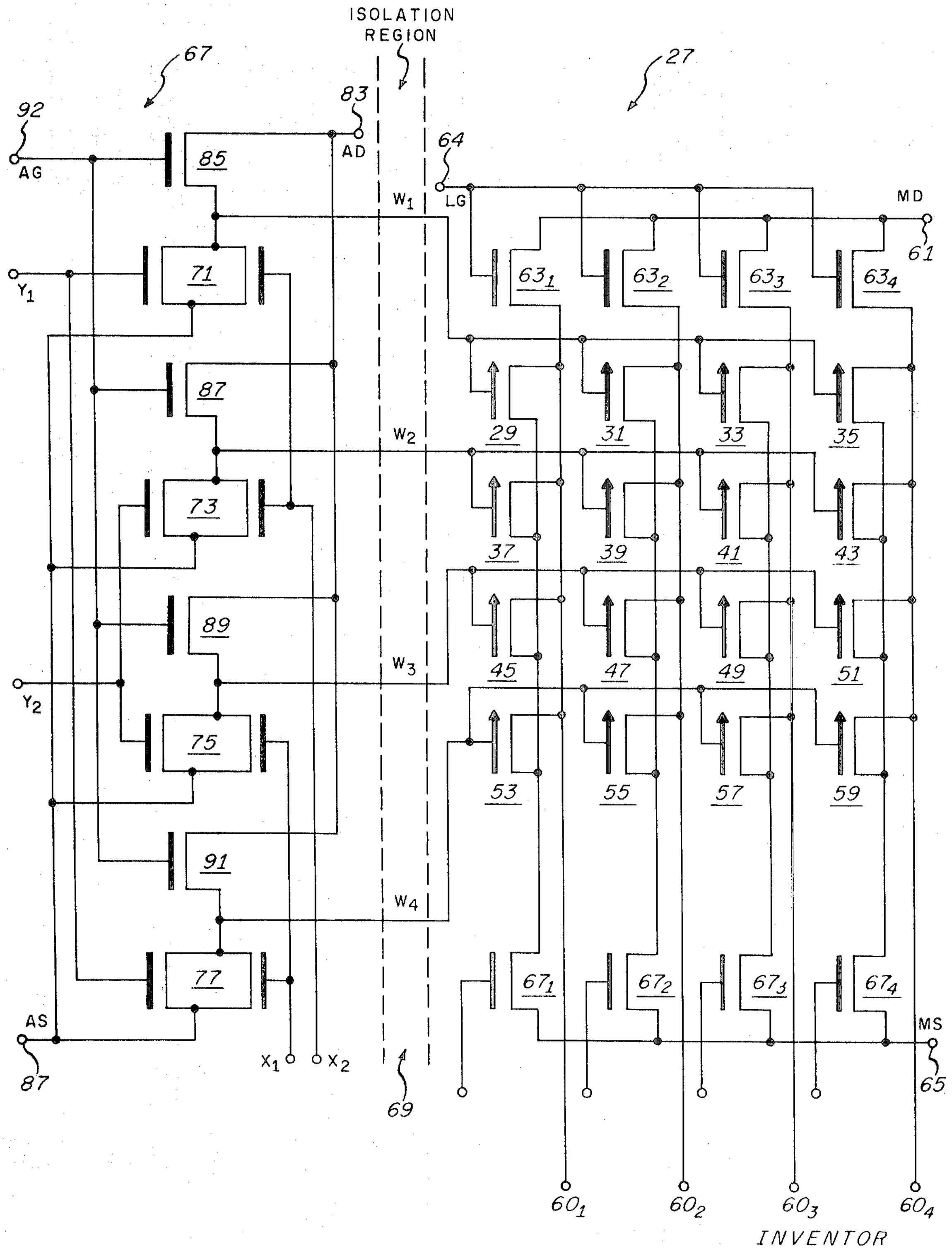
FIG. 4 is a schematic drawing of a particular circuit employing the principles of the invention.

FIG. 4 is a schematic diagram of a memory array employing the principles of the present invention. This array utilizes the switching scheme illustrated in FIGS. 1–3.

All of the memory cells, together with the necessary switching elements are formed on a common memory substrate 27. In the memory array illustrated, four words may be stored, each word containing four binary digits. This information is stored in the 16 memory cells 29–59.

Each of these memory cells is formed from a variable-threshold insulated gate field effect transistor of the type previously described. The memory cells 29 through 35 are arranged in word row 1, and used to store bits in the first word. The gate electrodes of each of these transistors are connected to a common word line $W_1$.

Similarly, the memory cells 37–43 are arranged in a word row with their gate electrodes connected to a second word line $W_2$.

Third and fourth word lines $W_3$ and $W_4$, are similarly connected to each of the gate electrodes in the memory cells constituting the third and fourth word rows of variable-threshold transistors respectively.

The memory cells are further arranged in bit columns. The memory cells in each of these bit columns have their drain electrodes connected together and brought out to output terminals 60. A common connection permits current to pass through one of the load transistors 63 to a memory drain voltage terminal 61. Thus, for example, the memory cells 29, 37, 45 ad 53 have their drain electrodes connected through the load transistor $63_1$ to drain voltage terminal 61. The load transistors may be conventional (fixed-threshold) insulated gate field effect transistors.

The load transistors are operated in parallel since their drain electrodes are all connected to a common memory drain terminal 61 and their gate electrodes are all connected to a common load gate terminal 64. The load transistors perform the functions of the drain switch 22 of FIGS. 1–3. The resistance of this transistor performs the function of the drain resistor 23 of FIGS. 1–3. The source electrodes of the memory cells in a given bit column are connected together. These electrodes may be optionally connected to a source voltage through one of the gating transistors 67 and a memory source voltage at the terminal 65. For example, the memory cells in the first bit column may be connected to a suitable voltage through a conventional field effect gating transistor $67_1$.

It will be noticed that all of the memory cells as well as the load transistor 63 and the gating transistor 67 are formed on the same common substrate.

The gating transistors can be operated individually. Their source electrodes are all connected to a common memory source terminal 65, but their gate electrodes are brought out to individual gate terminals.

The memory source terminal 65 is electrically connected to the common memory substrate.

The gating transistors perform the functions described by the source switch 25 of FIGS. 1–3. An address section 67 is formed on a section of the substrate that is insulated from the common memory substrate by means of an isolation region 69. The address section steers gate signals to desired word rows in the memory section.

In practice, both substrates may be formed on a single chip and isolated by means of a deep diffusion to form the isolation region 69. This means of isolating two sections of a single chip is known in the prior art.

The address section typically includes pairs of conventional NOR-gates 71, 73, 75 and 77 corresponding to each word in the memory.

By energizing $Y_1$ or $Y_2$ and $X_1$ or $X_2$ terminals, any one of the four words in the memory may be selected.

Address-switching transistors 85, 87, 89 and 91 serve to switch voltages applied to an address drain terminal 83 to a word row in the memory section selected by the NOR gates in response to an address gate voltage applied to an address gate terminal 92.

All of the transistors in the address section may be conventional insulated gate field effect transistors.

Thus, a $Y_1$ voltage may be applied to one of the gate electrodes in the NOR-gates 71 and 77. Concurrently, a voltage may be applied to the $X_1$ address terminal. This applies a voltage to the NOR-gates 75 and 77. Since both of the transistors in the NOR-gate 77 receive address signals under these conditions, word row four will be actuated at this time.

In summary, the address section selects desired rows. The gate and load transistors cooperate to select desired bit columns. All of these elements act in concert, forming a selection means for selecting given memory cells for READ or WRITE functions.

The WRITE cycle is begun by first applying voltages to the memory cells that set all of these cells to the positive voltage in a manner similar to that illustrated in FIG. 1.

It will be remembered that in the method of setting the positive threshold illustrated in FIG. 1, the substrate and source were grounded while a +50-volt pulse was applied to the gate electrode.

In the particular memory circuit of FIG. 4, it is more convenient to accomplish the same result by connecting the common memory substrate and the source terminals of the memory transistors to a potential of −50 volts while maintaining the gate electrodes of these transistors at ground potential. Effectively, a charge equivalent to +50 volts is stored in the plural dielectric of the memory transistors by either method.

All of the memory cells are set to the positive threshold or binary ZERO state by first setting the drain terminal 83 and the source terminal 87 in the address section to ground potential. This prepares the address section for applying a voltage at ground level to the gate electrodes of the transistors in each memory cell.

At the same time, a voltage of −50 volts is applied to the drain terminal 61 in the memory section and the source terminal 65 in the memory section.

Voltages are next applied to each of the gate electrodes in the gating transistors so as to cause these transistors to conduct. The −50-volt potential is thus applied to the source electrode in each of the memory cells. Under these conditions, the gate electrodes of the memory cells are at ground potential, and the common memory substrate is at −50 volts. Effectively, a positive voltage of 50-volts magnitude is applied to all gate electrodes and each memory cell is set to the positive threshold.

Individual memory cells are next set to the binary ONE state in accordance with the information to be stored. This is accomplished by applying voltages to these particular memory cells as illustrated in FIG. 2.

A potential of −40 volts is applied to the drain terminal 61 in the memory section and a potential of −50 volts to the drain terminal 83 in the address section at the same time that the source terminal 87 in the address section and the source terminal 65 in the memory section are held at ground potential.

Assume that a binary ONE is to be set in the memory cell 29 in the first word row and the first bit column. The first word row would be selected by grounding the gates of the transistors in the NOR-gate 71 and by applying a voltage to the gate electrode of the gating transistor $67_1$ that causes the transistor to saturate. A suitable voltage applied to the gate electrodes of the load transistors will also permit conduction through the load transistor $63_1$.

The gating transistor $67_1$ is effectively connected to ground. The memory cell 29 is subjected to the conditions shown in FIG. 2, and it will be switched to the binary ONE state.

Assume further that at the same time, a binary ZERO is to be stored in the memory cell 31 in the first word row and the second bit column. This will be accomplished by maintaining the gating transistor $67_2$ associated with the second bit column in the nonconductive condition while the load transistor $63_2$ associated with the same bit column is driven into conduction. Under these condition, a conductive channel will be formed in the memory cell 31 by virtue of the −50-volt potential applied to the memory cell gate. However, since the corresponding gating transistor $67_2$ remains nonconductive, the conducting channel in the memory cell will be maintained at the voltage of the drain terminal 61. Thus, the positive charge originally stored in the plural dielectric of the memory cell 31 will not be disturbed since it is now shielded by the conducting channel in the transistor. At the termination of the WRITE cycle, this transistor will remain in the binary ZERO state.

In a similar manner, each memory cell may be set to the binary state as desired by actuating selected NOR-gate transistors and the corresponding gate transistor in the memory section.

Readout is achieved by making the gating transistors in the memory section conductive, placing a potential in the order of −20 volts on the drain and gate terminals in the address section and the drain and load gating terminals in the memory section. By applying pulses to the address section, each memory cell is similarly pulsed by a voltage within the threshold values. Those memory cells storing a binary ZERO will pass a corresponding current; those memory cells storing a binary ONE will not.

An entire word may be read out simultaneously, or the bits in that word may be read out individually as desired.

Assume that memory cell 29 is storing a binary ONE as discussed previously. Under this condition, the cell will have a high internal resistance.

Assume further, that memory cell 31 is storing a binary ZERO. This cell will exhibit a low internal resistance.

During readout, the memory cell 31 will attempt to draw a large current through the comparatively high resistance of the load transistor $\mathbf{63_2}$. This will cause a voltage pulse to occur at the corresponding output terminal $\mathbf{60_2}$ of the memory section.

The memory cell 29, however, has a high internal resistance so that substantially no current will be drawn through the corresponding load transistor $\mathbf{63_1}$. The voltage at the output terminal $\mathbf{60_1}$ will remain substantially undisturbed.

By using the memory circuit of the present invention, only one deep isolation diffusion is required to separate the address section from the memory section. Because of this, fabrication of such memories is simplified and the number of defective units produced in a given run is minimized.

Because all of the memory cells are formed on a common substrate, isolation problems are minimal an a high component density can be realized.

Since only the gate voltage applied to the memory cells need be pulsed, the pulse timing and wave shape are not critical.

While the invention has been described in its preferred embodiment, it is to be understood that the words which have been used are words of description rather than limitation and that changes may be made without departing from the true scope and spirit of the invention in its broader aspects.

I claim:

1. In a computer memory employing plural dielectric layered variable-threshold transistor memory cells for storing respective binary bit data, each of said cells having source, drain and gate electrodes formed on a substrate common to all of the memory cells and being characterized by an electrically controllable conduction threshold established in accordance with the polarity of a voltage difference applied between the gate electrode and the substrate:

A. means for writing binary bit data into each of said memory cells comprising 1. means for applying a first threshold voltage between the gate electrode of each cell and the common substrate, said first threshold voltage having a polarity that inhibits the formation of a conducting channel between the source and drain electrodes of the memory cells whereby all of the memory cells are preset to a first binary state,
2. selection means to select those memory cells that are to be set to a second binary state,
3. means to apply a second threshold voltage between the gate electrodes of the selected memory cells and the common substrate, said second threshold voltage having a polarity opposite that of said first threshold voltage, and
4. means to maintain the source and drain electrodes of the memory cells not selected by said selection means at a voltage level intermediate the voltage level of the substrate and said second threshold voltage, B. means for reading information out of said memory cells comprising means to apply a READ voltage between the substrate and the gate electrodes of the memory cells, said READ voltage having the same polarity as the second threshold voltage but a magnitude less than said second threshold voltage.

2. The apparatus of claim 1 in which said memory cells are P-channel enchancement transistors and said first threshold voltage has a polarity that drives the gate electrodes of the memory cells positive with respect to the common substrate.

3. The apparatus of claim 2 in which the memory cells are arranged in an array of word rows and bit columns, said word rows being characterized in that all of the memory cells in a given row have their gate electrodes connected together and said bit columns being characterized in that all of the memory cells in a given column have their source electrodes connected together and their drain electrodes connected together.

4. The apparatus of claim 3 in which said selection means includes an insulated gate field effect transistor for each bit column, said insulated gate field effect transistors being formed on said common substrate and arranged for optionally connecting the source electrode of the memory cells in the associated column to the substrate.

5. The apparatus of claim 4 in which said selection means further includes addressing means for selectively applying gate voltages to the memory cells of individual word rows.

6. The apparatus of claim 5 in which said addressing means includes insulated gate field effect transistors formed on a section of said substrate electrically isolated from the section of said substrate containing said memory cells, sad insulated gate field effect transistors being arranged in switching circuits for steering gate voltages to selected word rows.

7. The apparatus of claim 6 in which the means for reading information out of the memory includes a load-insulated gate field effect transistor for each bit column, said load transistor being formed on said common substrate and being arranged for optionally connecting the drain electrodes of the memory cells in the associated bit column to a voltage source.

* * * * *